Patented Nov. 9, 1948

2,453,419

UNITED STATES PATENT OFFICE 2,453,419

BUOYANT ELECTRIC CABLE

Percy Dunsheath, Abinger, and William Cyril Barry, Gravesend, England, assignors to W. T. Henley's Telegraph Works Company Limited, London, England, a British company Original application November 30, 1940, Serial No. 367,924. Divided and this application November 30, 1946, Serial No. 713,319. In Great Britain January 4, 1940

9 Claims. (Cl. 174—101.5)

This invention is concerned with the production of insulated electric power cable which is capable of floating in water and of transmitting power currents. For many purposes such cable must be flexible as well as buoyant and must possess sufficient tensile strength to enable it to be trailed in considerable lengths without excessive deformation. It should offer as little friction as practicable and it should be capable of giving up easily to the medium in which it floats heat generated in the cable by the passage of current therethrough. In the specification of our copending application Serial No. 367,924 filed on November 30, 1940, and of which this application is a division there is described and claimed a cable which satisfies the aforesaid rather onerous requirements and comprises a buoyancy element in the form of an elongated cellular member built up of a series of resilient members with relatively rigid members intercalated in the series of resilient members. In the specific forms of construction claimed in the said application the resilient members are inflated hollow bodies. By the present invention we provide a form of construction of buoyant cable comprising a buoyancy element consisting of a flexible cellular core comprising a series of members of resilient cellular material and a plurality of members of relatively rigid material intercalated in the series of members of resilient cellular material. The combination of members of resilient cellular material with members of relatively rigid material results in a core which is sufficiently flexible yet possesses adequate resistance to radial compression exerted, for instance, at a paying out capstan or due to tension in an enveloping conductor.

The cellular core may comprise a series of cylinders of resilient cellular material, for instance, soft expanded rubber, with intercalations of cylinders of relatively rigid cellular material, for instance, hard expanded rubber, cork or wood. The term "cylinder" is used herein and in the claims in its broadest sense and where the context permits includes not only right circular cylinders but bodies having a surface approximating to the cylindrical, cylindrical or approximately cylindrical surfaced bodies with concave or convex ends and such short cylindrical or approximately cylindrical bodies as might properly be termed discs.

Generally the core will consist of a single chain of members of resilient cellular material and relatively rigid members but in some cases the cellular core may be built up of a number of such chains bunched or laid up helically together.

The invention will now be more fully described with the aid of the accompanying drawings which show by way of example only, three specific forms of cable with buoyant cores constructed, in accordance with the invention, of a series of members of resilient cellular material with intercalations of relatively rigid members.

In the drawings

Figure 1:
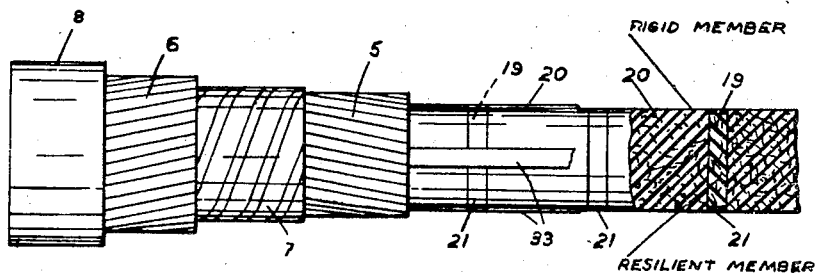
Figure 1 is an elevation, partly in section, of the stepped end of a buoyant heavy current cable with one form of cellular core.

In the form of construction shown in Figure 1, the cellular core 1 consists of a series of members 19 of resilient cellular material with intercalations of cylinders 20 of relatively rigid cellular material. The cylinders 19 are preferably of soft expanded rubber and cylinders 20 of hard expanded rubber but, alternatively, the latter may well be of cork or wood. The cellular elements 19 and also the cellular elements 20 may be cut from expanded rubber sheet and provided with a skin 21 of tough rubber to strengthen them and better enable them to support the conductor, which is disposed about the cellular core and consists of an inner layer 5 of wires stranded directly on the core and of an outer layer 6 of wires stranded in the opposite direction over a lapping 7 of tape applied to the first layer to prevent it "bird-caging" while the second layer is being applied. Over the tubular conductor so formed is a sheath 8 of tough rubber which serves both as insulation for the conductor and as a waterproof protective sheath.

Figure 2:
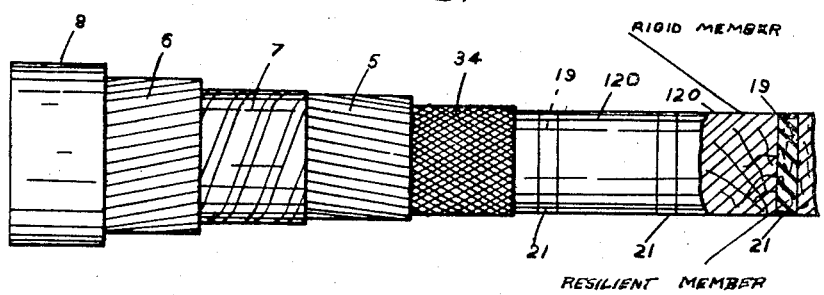
Figure 2 is a similar view of a buoyant heavy current cable with a second form of cellular core.

In the form of construction shown in Figure 2, the buoyant core consists of a series of cylinders 19 of resilient cellular material, preferably soft expanded rubber with cylinders 120 of wood intercalated in the series of cylinders of soft expanded rubber. The conductor is constructed in exactly the same way as that described with reference to Figure 1 and needs no further description. It is insulated and protected by a sheath 8 of tough rubber.

Figure 3:
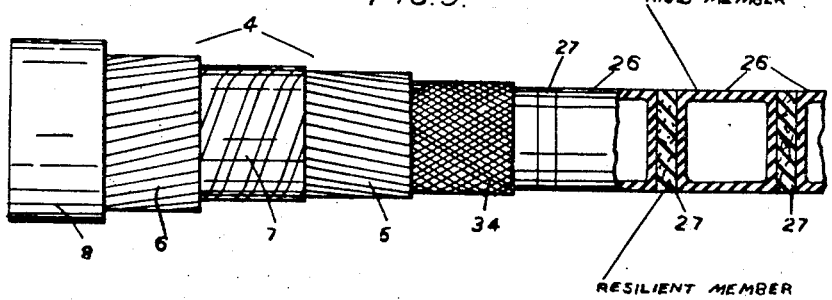
Figure 3 is a similar view of a buoyant heavy current cable with a third form of cellular core.

In the third form of cable, shown in Figure 3, the cellular core is built up of rigid hollow drums 26 separated by discs 27 of resilient cellular material, for instance, discs of soft expanded rubber. The hollow cylinders or drums 26 are of moulded material, for instance, hard rubber or a phenol-formaldehyde resin or of metal. The construction of the surrounding conductor and its envelope are the same as those of Figure 1.

In each of the three examples of buoyant cable described, the cellular core I is built up of a plurality of separate members, some or all of which are of resilient cellular material and others of which are relatively rigid, placed end to end. In the manufacture of such cable it is in most cases advantageous to connect the individual units together. This may be done in several ways, for instance, by uniting the central parts of the adjacent end faces of successive members by adhesive. Where the members are of rubber or alternatively of rubber and wood, a coumarone resin-rubber adhesive is suitable. It may be advantageous so to build up the core first in lengths of several feet and subsequently to join these lengths into long lengths. Alternatively, or additionally, the members may be connected together by a plurality of adhesive tapes 33 extending longitudinally of the core as shown in Figure 1 or by covering them with a light open braid 34 of cotton or other suitable material as shown in Figure 2 and Figure 3. The units of the core may be fed into the hollow conductor during the assembly of the component wires. Where the units are of annular form the core may be assembled by threading them on a cord or wire, or where the cable has a central conductor by threading them on the insulated conductor, as described and claimed in our copending application Serial No. 713,320, filed November 30, 1946.

The core may, however, in certain cases be manufactured as an elongated cavitied member by the method, described in the final paragraph of the specification of the aforesaid application, Serial No. 713,320, of heating within a tubular mould a composite body built up of alternate hollow bodies and separating discs of rubber until vulcanization is complete. In this case, the hollow bodies will be of unvulcanized hard rubber composition and the discs of an unvulcanized soft cellular rubber mix.

What we claim as our invention is:

1. In water-buoyant insulated electric power cable, a buoyancy element consisting of a flexible cellular core comprising a series of cylinders of resilient cellular material and a plurality of cylinders of relatively rigid material intercalated in said series of cylinders of resilient cellular material.

2. In water-buoyant insulated electric power cable, a buoyancy element consisting of a flexible cellular core comprising a series of cylinders of soft expanded rubber and a plurality of cylinders of hard expanded rubber intercalated in said series of cylinders of soft expanded rubber.

3. In water-buoyant insulated electric power cable, a buoyancy element consisting of a flexible cellular core comprising a series of cylinders of soft expanded rubber and a plurality of cylinders of wood intercalated in said series of cylinders of soft expanded rubber.

4. In water-buoyant insulated electric cable a buoyancy element consisting of a flexible cellular core comprising a series of cylinders of resilient cellular material, a plurality of cylinders of relatively rigid material intercalated in said series of cylinders of resilient material and a skin of tough rubber provided on the peripheral surface of each of at least some of said cylinders of resilient cellular material.

5. In water-buoyant insulated electric power cable a buoyancy element consisting of a flexible cellular core comprising a series of cylinders of resilient cellular material and a plurality of hollow cylinders of relatively rigid material intercalated in said series.

6. In water-buoyant insulated electric power cable a buoyancy element in the form of an elongated cellular member built up of a series of members of resilient cellular material and of hollow cylinders of relatively rigid moulded material intercalated in said series.

7. In water-buoyant insulated electric power cable, a buoyancy element consisting of a flexible cellular core comprising a series of cylinders of resilient cellular material, a plurality of cylinders of relatively rigid material intercalated in said series of cylinders of resilient cellular material and a plurality of adhesive tapes extending longitudinally of the core and connecting together said cylinders of resilient cellular material and relatively rigid material.

8. In water-buoyant insulated electric power cable having a flexible cellular core comprising a series of cylinders of resilient cellular material and a plurality of cylinders of relatively rigid material intercalated in said series of cylinders of resilient cellular material, and an open tubular braid enclosing said cylinders of resilient cellular material and said cylinders of relatively rigid material.

9. In water-buoyant insulated electric power cable having a flexible cellular core comprising a series of cylinders of resilient cellular material and a plurality of cylinders of relatively rigid material intercalated in said series of cylinders of resilient material, and a conductor of hollow form enclosing said core and comprising a plurality of component wires extending helically round said core.

PERCY DUNSHEATH.
WILLIAM CYRIL BARRY.

No references cited.